US012659235B1

(12) United States Patent
Murthy et al.

(10) Patent No.: US 12,659,235 B1
(45) Date of Patent: Jun. 16, 2026

(54) SYSTEMS AND METHODS FOR SEGMENTING NETWORKS USING USER DEFINED NETWORKS

(71) Applicant: Cisco Technology, Inc., San Jose, CA (US)

(72) Inventors: Shree N. Murthy, San Jose, CA (US); Stephen Michael Orr, Wallkill, NY (US); Sanjay Kumar Hooda, Pleasanton, CA (US); Sudhir Kumar Jain, Fremont, CA (US); Darrin Joseph Miller, Marysville, OH (US); Ameet Prakash Kulkarni, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 17/508,155

(22) Filed: Oct. 22, 2021

(51) Int. Cl.
 *H04L 9/00* (2022.01)
 *H04L 9/40* (2022.01)
 *H04L 41/12* (2022.01)

(52) U.S. Cl.
 CPC .......... *H04L 41/12* (2013.01); *H04L 63/0236* (2013.01); *H04L 63/0876* (2013.01); *H04L 63/0892* (2013.01); *H04L 63/101* (2013.01); *H04L 63/102* (2013.01); *H04L 63/20* (2013.01)

(58) Field of Classification Search
 CPC . H04L 41/12; H04L 63/0236; H04L 63/0876; H04L 63/0892

USPC .............................................................. 726/1
See application file for complete search history.

(56) References Cited

U.S. PATENT DOCUMENTS

| | | | | |
|---|---|---|---|---|
| 7,433,943 | B1 * | 10/2008 | Ford ..................... | H04L 47/808 709/224 |
| 11,244,561 | B1 * | 2/2022 | Fuchs ................... | H04W 12/68 |
| 2004/0103203 | A1 * | 5/2004 | Nichols ............... | H04L 63/0815 709/229 |
| 2014/0307626 | A1 * | 10/2014 | Hintersteiner ...... | H04W 52/243 370/328 |
| 2015/0372870 | A1 * | 12/2015 | Stiff .................... | H04L 12/4641 370/338 |
| 2021/0090080 | A1 * | 3/2021 | Kang ................... | G06Q 20/325 |
| 2022/0060898 | A1 * | 2/2022 | Liu ..................... | H04W 12/069 |

* cited by examiner

*Primary Examiner* — Christopher J Brown
(74) *Attorney, Agent, or Firm* — Patterson + Sheridan, LLP

(57) ABSTRACT

Systems and methods for creating user defined network in a network environment is provided. Users are able to create user defined networks which as private logical groups that extend across different wired and wireless networking constructs. A user may use an endpoint (e.g., mobile phone) to create a user defined network, to associate one or more endpoints with the user defined network, and to invite other users to add their endpoints to the user defined network. The user may create a policy for endpoints in the user defined network such as only allowing endpoints associated with the user defined network or restricting types of traffic that can be communicated to endpoints in the user defined network. The user defined network, and associated policies, may be enforced by the infrastructure devices in the network environment.

20 Claims, 6 Drawing Sheets

305

Receive request to create UDN

310

Assign UDN Identifier

315

Authenticate endpoint

320

Provide UDN identifier

325

Assign one or more other endpoints to UDN Identifier/ create policy

606

604

System Memory

Volatile

Non-Volatile

Processing
Unit 602

Removable Storage
608

Non-Removable
Storage 610

Output Device(s)
616

Input Device(s) 614

Communication
Connection(s) 612

600

SYSTEMS AND METHODS FOR SEGMENTING NETWORKS USING USER DEFINED NETWORKS

BACKGROUND

In a wireless network environment such as a home network, endpoints (e.g., devices, computers, mobile devices, and tablet computers) are generally segregated into user groups using Service Set Identifiers ("SSID"). Generally, trusted endpoints are allowed to connect to the main SSID and are allowed to communicate with other endpoints connected to the main SSID without restriction. Untrusted endpoints are allowed to connect to a guest SSID and are not permitted to communicate with other endpoints connected to the network.

While this approach works in a home environment, it does not scale well to multi-tenant shared networks such as dorm rooms, hotels, and apartment or condominiums. For example, in a dorm environment residents may each have multiple endpoints (e.g., televisions, computers, printers, videogame consoles, and mobile devices) connected to the shared network. Residents may desire to restrict access to their endpoint to specific users (e.g., roommates or other friends), but are unable to create their own SSID in the shared network to allow for such restrictions. Moreover, some endpoints may connect to the network using a physical or wired connection (e.g., ethernet) and therefore cannot be segregated using a wireless SSID.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
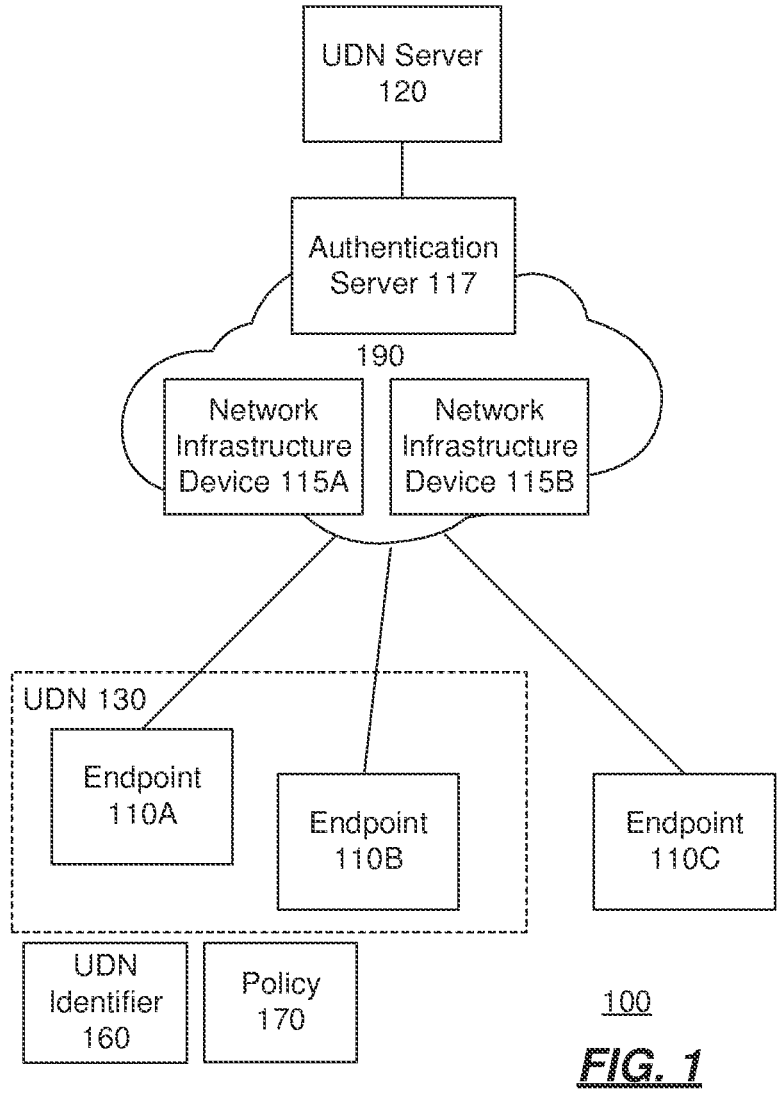
FIG. 1 is an illustration of an exemplary environment for providing a user defined network.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments.

Systems and methods for creating a user defined network in a network environment is provided. Users are able to create user defined networks which as private logical groups that extend across different wired and wireless networking constructs (e.g., SSID, VLAN, and VxLAN). A user may use an endpoint (e.g., mobile phone) to create a user defined network, to associate one or more endpoints with the user defined network, and to invite other users to add their endpoints to the user defined network. Only endpoints associated with the user defined network may be permitted to communicate with other endpoints in the user defined network. The user defined network may be enforced by the infrastructure devices in the network environment. When an endpoint connects to the network a RADIUS authentication server may determine which user defined networks the endpoint belongs to as part of the authentication process.

In one embodiment, a method is provided. The method includes: receiving a request to create a user defined network by computing device from an endpoint associated with a first user; in response to the request, assigning a user defined network identifier to the user defined network by the computing device; adding the endpoint as a member of the user defined network by the computing device; selecting a policy for the user defined network by the computing device; and providing the user defined network and policy to one or more network infrastructure devices for enforcement of the policy on members of the user defined network by the computing device.

Embodiments may include some or all of the following features. The computing device may be an authentication server. The authentication server may be a RADIUS server. The user defined network identifier may not be transferred between the endpoint and one or more network infrastructure devices. The policy includes only allowing network traffic between members of the user defined network. The network traffic may include unicast, multicast, and broadcast traffic. Providing the user defined network to the one or more network infrastructure devices may include providing the user defined network identifier, a user defined network name, and an owner flag. Providing the user defined network to one or more network infrastructure devices may include providing the user defined network identifier as part of an authorization profile. The method may further include: receiving a request to add a second user to the user defined network from the first user; in response to the request, generating and sending an invitation to the second user; determining that the invitation was accepted; and in response to the determination, generating and sending a change of authorization for the user defined network, wherein the change of authorization identifies one or more endpoints associated with the second user.

In an embodiment, a method is provided. The method includes: creating a user defined network for a first user by a computing device; adding an endpoint associated with the first user as a member of the user defined endpoint by the computing device; providing the user defined network and a policy to one or more network infrastructure devices for enforcement of the policy on members of the user defined network by the computing device; receiving a request to add a second user to the user defined network from the first user by the computing device; in response to the request, generating and sending an invitation to the second user by the computing device; determining that the invitation was accepted by the computing device; and in response to the determination, generating and sending a change of authorization for the user defined network by the computing device, wherein the change of authorization identifies one or more endpoints associated with the second user.

Embodiments may include some or all of the following features. The computing device may be an authentication server. The authentication server may be a RADIUS server. The user defined network identifier may not be transferred between the endpoint and the one or more network infrastructure devices. The policy may include only allowing network traffic between members of the user defined network. The network traffic may include unicast. multicast, and broadcast traffic. Providing the user defined network to the one or more network infrastructure devices may include providing the user defined network identifier, a user defined network name, and an owner flag. Providing the user defined network to the one or more network infrastructure devices may include providing the user defined network identifier as part of an authorization profile.

In an embodiment, a system is provided. The system includes: an endpoint associated with a first user; a plurality of network infrastructure devices associated with a network; and an authentication server. The authentication server is adapted to: receive a request to create a user defined network from the endpoint; in response to the request, assign a user defined network identifier to the user defined network; add the endpoint as a member of the user defined network; select a policy for the user defined network; and provide the user defined network and policy to one or more network infrastructure devices of the plurality of network interface devices for enforcement of the policy on members of the user defined network.

Embodiments may include some or all of the following features. The authentication server may be a RADIUS server. The user defined network identifier may not be transferred between the endpoint and the one or more network infrastructure devices.

EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary environment 100 for providing a user defined network ("UDN") 130. As shown, the environment 100 may include a network 190 that is made up of a plurality of network infrastructure devices 115 (e.g., the network infrastructure devices 115A and 115B). The network infrastructure devices 115 may include hardware devices such as network switches, bridges, routers, and wireless access points. Other types of network infrastructure devices 115 may be supported. While only two devices 115 are shown, it is for illustrative purposes only. More or fewer devices 115 may be supported by the network 190.

The environment 100 may further include one or more endpoints 110 (e.g., the endpoints 110A, 110B, and 110C). Each endpoint 110 may be a device that connects to the network 190 via one or more network infrastructure devices 115. For example, the endpoints 110 may include devices such as laptops, desktop computers, videogame consoles, smartphones, tablet computers, televisions, thermostats, and any type of device that is capable of communicating via the network 190. The endpoints 110 may connect wirelessly to the network 190 via a network infrastructure device 115 such as a wireless access point, or may connect through a wire (e.g., ethernet) to the network 190 via a network interface device 115 such as a switch. While only three endpoints 110 are show, it is for illustrative purposes only. More or fewer endpoints 110 may be supported by the network 190.

The network 190 may further include an authentication server 117. The authentication server 117 may authenticate endpoints 110 that connect to the network 190 before allowing them to communicate through the network 190. An example authentication method that may be used by the authentication server 117 includes Remote Authentication Dial-In User Service ("RADIUS") authentication. Other types of authentication may be used.

The environment 100 may further include a UDN server 120 that allows for the creation and modification of UDNs 130 for the network 190. In some embodiments, a UDN 130 may be a type of logical grouping that includes one or more endpoints 110. The endpoints 110 in a UDN 130 are governed by a policy 170, while endpoints 110 that are not part of the UDN 130 are not subject to the policy 170. In the example shown, the endpoints 110A and 110B are part of the UDN 130, while the endpoint 110C is not part of the UDN 130. Each UDN 130 may have an associated UDN identifier 160 that uniquely identifies the UDN 130.

Examples of policies 170 that may apply to a UDN 130 include policies about the amount of bandwidth that may be used by members of the UDN 130, policies about the types of traffic that may be communicated by members of the UDN 130, and policies that only allow traffic (or certain types of traffic) to be exchanged among members of the UDN 130. Other types of policies 170 may be supported.

As will be described below with respect to FIG. 2, initially a user may create a UDN 130 by connecting to the UDN server 120, providing a name for the UDN 130, and selecting one or more endpoints 110 to include the UDN 130. The user may further select a policy 170 for the UDN 130. The UDN server 120 may then determine the UDN identifier 160 for the UDN 130.

After creating the UDN 130, the UDN server 120 may provide information about the UDN 130, including members and associated policy 170, to the authentication server 117. Later, when an endpoint 110 in the UDN 130 is authenticated by the authentication server 117, the authentication server 117 identifies the endpoint 110 as being a part of the UDN 130 and provides information about the UDN 130 to the network infrastructure devices 115. The network infrastructure devices 115 may then enforce the policy 170 among the endpoints 130 that are members of the UDN 130.

Figure 2:
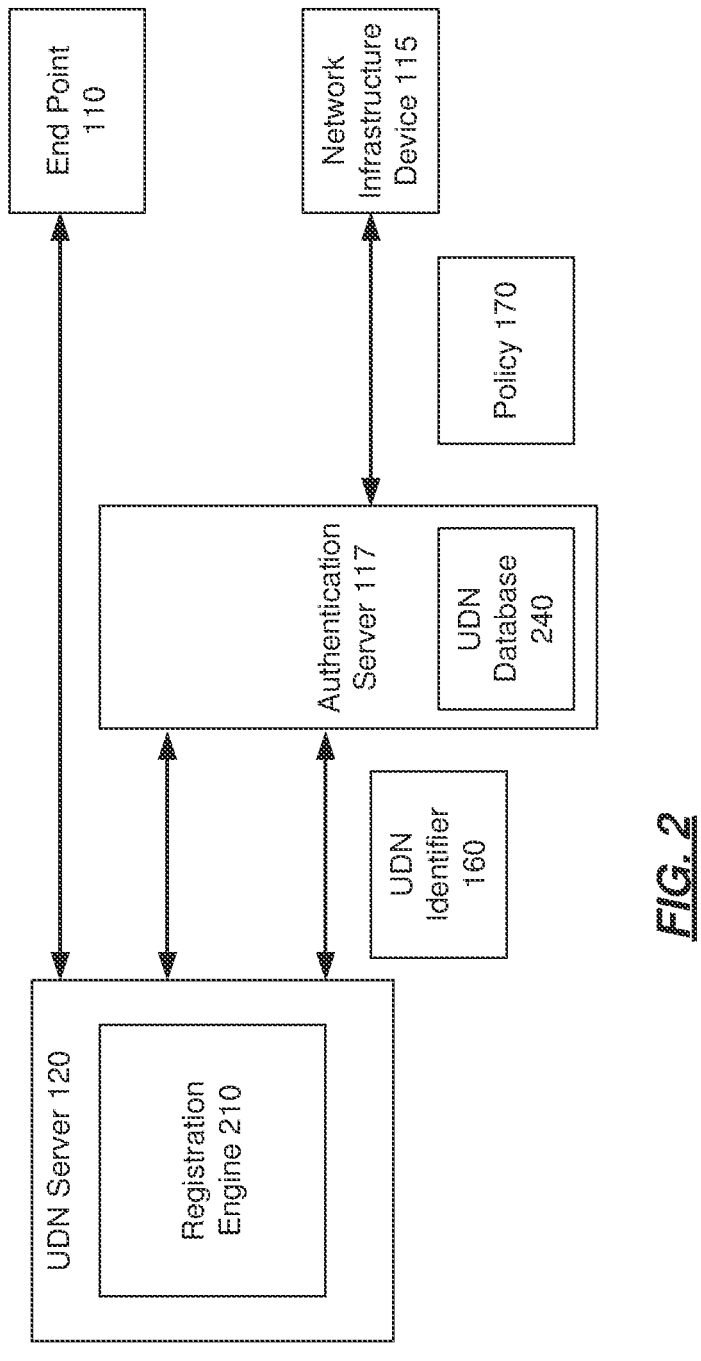
FIG. 2 is an illustration of an example user defined network server and an example authentication server.

FIG. 2 is an illustration of an example UDN server 120 and authentication server 117. As shown, the UDN server 120 includes one or more components including a registration engine 210. More or fewer components may be supported. Both the authentication server 117 and the UDN server 120 may be implemented together or separately using one or more general purpose computing devices such as the computing device 600 illustrated with respect to FIG. 6. Depending on the embodiment, some aspects of the UDN server 120 may be implemented using a cloud-based computing environment.

The registration engine 210 may allow users to create, modify, and invite other users to join a UDN 130. In some embodiments, the registration engine 210 may expose an API through which users may connect with the registration engine 210 for purposes of UDN 130 creation. Alternatively or additionally, the registration engine 210 may provide an application or "app" through which the user may create (and modify or edit) a UDN 130. The app may run a mobile phone or other endpoint 110 associated with the user.

Initially, a user may connect to the registration engine 210 to create a UDN 130. The user may use the app to provide a name for the UDN 130, and the registration engine 210 may generate a unique UDN identifier 160 for the UDN 130. The user may further use the app to select one or more endpoints 110 that they would like to include in the UDN 130. These endpoint 130 may include endpoints 110 that were registered by the user or that were identified by the user using the app. Once selected, the registration engine 210 may add the selected endpoints 130 as members of the UDN 130. Depending on the embodiment, the registration engine 210 may associate each endpoint 110 with the UDN 130 by storing media access control ("MAC") addresses corresponding to each endpoint 130 with the UDN identifier 160 corresponding to the UDN 130.

The registration engine 210 may further allow the user to create or define a policy 170 for the UDN 130. Example policies 170 may include whether to allow unicast traffic and whether to support shared resources. In some embodiments, if no policy 170 is selected by the user, the registration engine 210 may apply a default policy to the UDN 130. The default policy 170 may be that endpoints 110 in the UDN 130 are restricted to only communicate or exchange traffic with other endpoints 110 in the UDN 130.

In some embodiments, the registration engine 210, prior to or after creating the UDN 130 for the user, may authenticate the user. The registration engine 210 may receive authentication credentials (e.g., username and password) from the user, and may authenticate the user via the authentication server 117. After the user has been authenticated, the registration engine 210 may provide information about the UDN 130 to the authentication server 117 including the UDN identifier 160, associated policy 170, UDN name, and member list. The authentication server 117 may store the received information in a UDN database 240, for example.

The authentication server 117, as described above, may authenticate endpoints 110 that join the network 190 via one or more network infrastructure devices 115. As part of the authentication process, the authentication server 117 may also determine if the endpoint 110 belongs to any UDN 130 based on the information in the UDN database 240. If so, after authenticating the endpoint 110 the authentication server 117 may send information about the UDN 130, including the name, UDN identifier 160, and associated policy 170, to the network infrastructure device 115 that asked the authentication server 117 to authenticate the endpoint 110.

For example, where the authentication server 117 is a RADIUS authentication server 117, when the endpoint 110 connects to a network infrastructure device 115 such as an access point, the access point may generate and send a RADIUS request for authentication for the connecting endpoint to the authentication server 117. The authentication server 117 may determine that the endpoint 110 is part of a UDN 130 and may send information about the UDN 130 along with the RADIUS authorization profile. In some embodiments, the authentication server 117 may send the information about the UDN 130 by addition three additional fields to the authorization profile including, but not limited to, the UDN identifier 140, the name of the UDN 130, and an owner flag. The owner flag may specify whether or not the endpoint 110 is associated with the user that owns or controls the UDN 130.

The infrastructure device 115 may receive the authorization profile, including the information about the UDN 130, and may enforce the profile 170 associated with the UDN 130 for the endpoint 110. For example, if the policy 130 specifies that the endpoint 110 can only see and communicate with other members of the UDN 130 on the network 190, the infrastructure device 115 may only pass communications from the endpoint 110 to other endpoints 110 on the network 190 that are members of the UDN 130. Depending on the embodiment, the infrastructure device 115 may share the authorization profile, including UDN 130 information, with other infrastructure devices 115 associated with the network 190. The other infrastructure devices 115 may similarly enforce the policy 170 associated with the UDN 130 as described above.

The registration engine 210 may further allow users to invite other users to join their UDN 130 using the app or other interface. In some embodiments, the user who created or owns the UDN 130 may use the app to identify other users to the UDN 130. The user may provide email addresses, or other electronic addresses or accounts associated with each user, and the registration engine 210 may send invitations to join the group to each user. Each user may then either accept or deny the invitation. For users that accept the invitation, the registration engine 210 may request that the users identify the particular endpoints 110 that they would like to join the UDN 130. For example, the users may provide or select MAC addresses of the endpoint 110 that they would like to join the UDN 130.

After adding one or more endpoints 110 to the UDN 130, the registration engine 210 may update the information about the UDN 130 stored by the authentication server 117. In some embodiments, in response to an update to the UDN 130, the authentication server 117 may send one or more change of authorization ("CoA") for the endpoints 110 added or removed from the UDN 130. The CoA sent for an endpoint 115 added to a UDN 130 may include the three additional RADIUS attributes described above (e.g., the UDN identifier 140, the name of the UDN 130, and the owner flag). Other information may be included.

Figure 3:
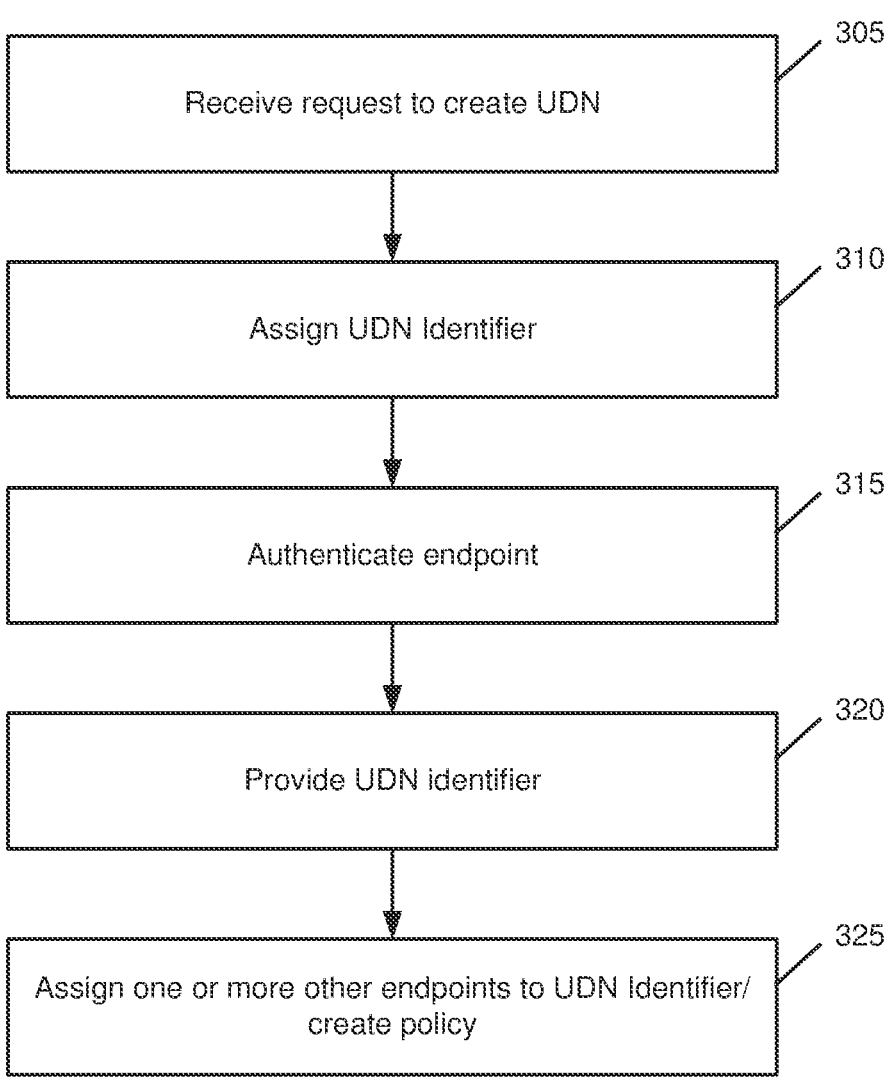
FIG. 3 is an operational flow of an implementation of a method for creating a user defined network.

FIG. 3 is an operational flow of an implementation of a method for creating a user defined network. The method 300 may be implemented by one or more of the authentication server 117 or the UDN server 120.

At 305, a request to create a UDN is received. The request to create a UDN 130 may be received by the UDN server 120 from a user via an endpoint 110. In some embodiments, the user may use an app on an endpoint 110 such as a mobile computing device or smartphone. The user may create the UDN 130 by providing a name for the UDN 130. The UDN 130 may be logical grouping of endpoints 110 such that endpoints 110 in the UDN 130, when connected to the network 190, may interact as if they were connected using their own exclusive personal network. In some embodiments, a policy 170 associated with the UDN 130 may be enforced on the network 190 by one or more infrastructure devices 115 (e.g., switches or access points). The policy 170 may be enforced regardless of how the endpoints 110 are connected to the network 190 (e.g., wirelessly or wired) and may apply across VLANs or VxLANS.

At 310, an identifier is assigned to the UDN. The identifier 160 may be assigned to the UDN 130 by the registration engine 210 of the UDN server 120. The identifier 160 may uniquely identify the UDN 130 in the network 190. Any method for generating a unique identifier may be used.

At 315, the endpoint is authenticated. The endpoint 110 may be authenticated by the authentication server 117. For example, the registration engine 210 may provide credentials associated with the user creating the UDN 130 to the authentication server 117.

At 320, the UDN identifier is provided. The UDN identifier 160 may be provided by the UDN server 120 to the authentication server 117. The authentication server 117 may store the UDN identifier 160 along with an identifier of the endpoint 110 associated with the user that created the UDN 130 in the UDN database 240.

At 325, one or more other endpoints are assigned to the UDN. The one or more other endpoints 110 may be assigned as members of the UDN 130 by the UDN server 120. In some embodiments, the user may use the same app that they created the UDN 130 with to create a policy 170 for the UDN 130 and to add one or more endpoints 110. As will be described further with respect to FIG. 5, the user may also invite one or more other users to join the UDN 130.

Figure 4:
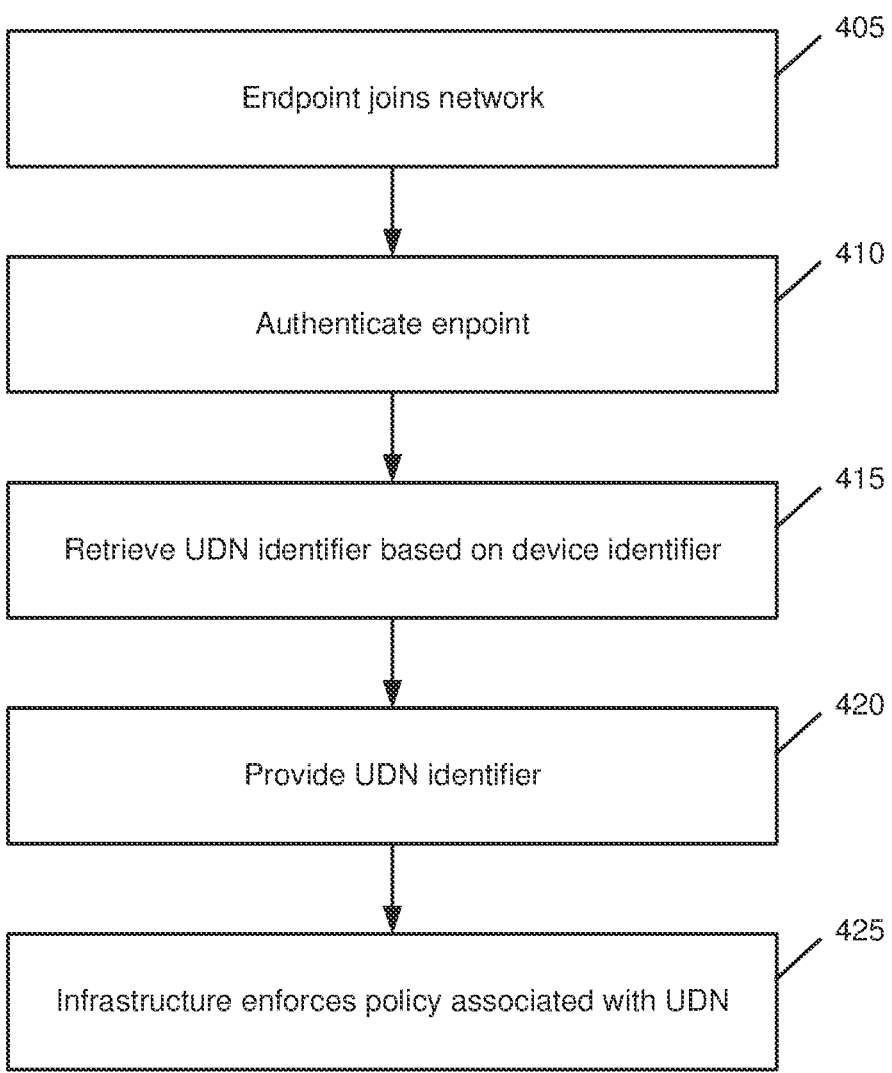
FIG. 4 is an operational flow of an implementation of a method for endpoint onboarding with respect to a user defined network.

FIG. 4 is an operational flow of an implementation of a method for endpoint onboarding with a UDN. The method 400 may be implemented by one or more of the authentication server 117 or the UDN server 120.

At 405, an endpoint joins a network. The endpoint 110 may joint the network 190 by connecting to one or more network infrastructure devices 115. The infrastructure devices 110 may include access points and switches, for example. Other devices may be supported. The endpoint 110 may be a member of a UDN 130. The endpoint 110 may be associated with a device identifier that uniquely identifies the endpoint 110 on the network 190.

At 410, the endpoint is authenticated. The endpoint 110 may be authenticated by the authentication server 117 using credentials provided by a user associated with the endpoint 110. The credentials may include the device identifier associated with the endpoint 110. The authentication server 117 may be a RADIUS authentication server 171. Other types of authentication may be supported.

At 415, a UDN identifier is retrieved. The UDN identifier 160 may be retrieved from the UDN database 240 by the authentication server 117 using the device identifier. The authentication server 117 may search the UDN database 240 using the device identifier to determine that the endpoint 110 is a member of the UDN 130 as part of the authentication process.

At 420, the UDN identifier is provided. The UDN identifier 160 may be provided by the authentication server 117 to the network infrastructure device 115. The identifier 160 may uniquely identify the UDN 130 that the endpoint 110 is a member of to the infrastructure device 115. In some embodiments, the identifier 160 may be provided as part of the authorization profile provided by the authentication server 117. The authorization profile may include the UDN identifier 140, the name of the UDN 130, and an owner flag.

At 425, one or more policies associated with the UDN are enforced. The one or more policies 170 may be enforced by the infrastructure device 115. Depending on the embodiment, enforcing the policy 170 may include only allowing the endpoint 110 to communicate with other endpoints 110 that are also members of the UDN 130 identified by the UDN identifier 160.

Figure 5:
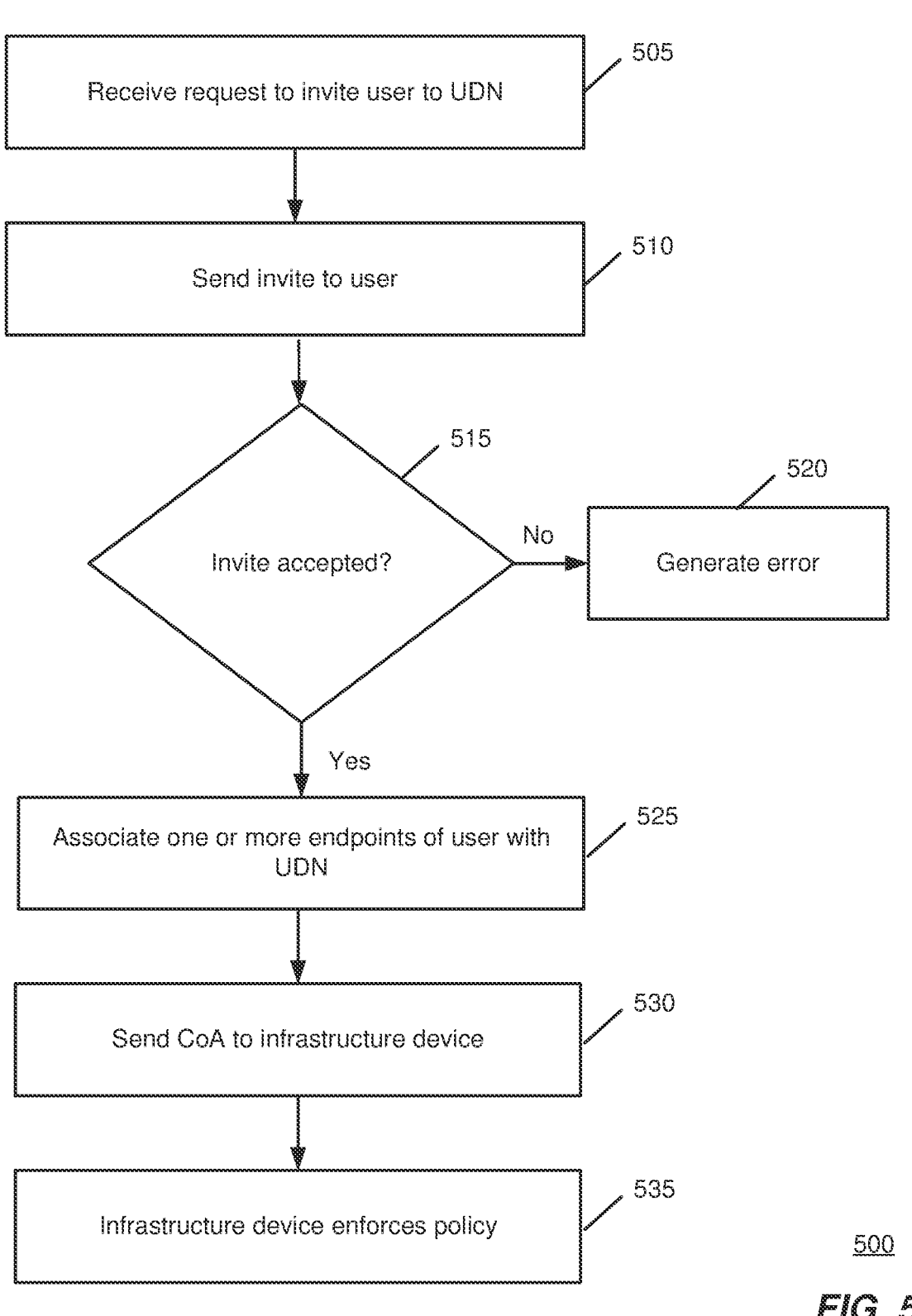
FIG. 5 is an operational flow of an implementation of a method for adding a user to a user defined network.

FIG. 5 is an operational flow of an implementation of a method 500 for adding a user to a UDN 130. The method 500 may be implemented by one or more of the authentication server 117 or the UDN server 120.

At 505, a request to invite a user to a UDN is received. The request may be received by the registration engine 210 of the UDN server 120. In some embodiments, a user who controls or owns a UDN 130 may use an app or other application to invite a user to join the UDN 130. For example, the user may provide an email address associated with the user that they would like to join the UDN 130.

At 510, an invite is sent to the user. The invite may be sent by the registration engine 210 to the user through the network 190. The invite may include a name of the UDN 130, information about the policy 170 associated with the UDN 130, and the name of the user that sent the invite. Depending on the embodiment, the invite may also include identifiers of the endpoints 110 that are known to be associated with the user or may provide a link or user interface element through which the user can add endpoints 110 to the UDN 130. The user may either accept the invite (and select the endpoints 110 that will be added to the UDN 130) or may decline the invitation. If the user declines the invitation, the method 500 may continue at 520, where an error may be generated and/or the inviting user may be informed that the invitee user has declined the invitation. Else, the method 500 may continue at 525.

At 525, one or more endpoints are associated with the UDN 130. The one or more endpoints may be added as members of the UDN 130 by the registration engine 210 of the UDN server 120. The one or more endpoints 110 may have been selected or indicated by the invitee user to include in the UDN 130. Depending on the embodiment, the registration engine 210 may associate each of the one or more endpoints 110 with the UDN 130 by adding one or more device identifiers of the one or more endpoints to the UDN 130. The registration engine 210 may send the updated UDN 130, including added endpoints 130, to the authentication server 117.

At 530, a CoA is sent to an infrastructure device. The CoA may be sent by the authentication server 117 to the network infrastructure device 115 that the one or more endpoints 115 that were added to the UDN 130 are currently connected to. The CoA send for an endpoint 110 may be a change to the authorization profile previously provided by the authentication sever 117 for the endpoint 110 and may include the identifier 160 of the UDN 130, the name of the UDN 130, and the owner flag. Other information may be included. After or before sending the COA, the authentication server 117 may update the UDN database 240 to reflect the new endpoints 110 added to the UDN 130.

At 535, the infrastructure device enforces the policy. The infrastructure device 115 may enforce the policy 170 associated with the UDN 130 by, for example, only allowing endpoints 110 to communicate with other endpoints 110 that are also in the UDN 130.

Figure 6:
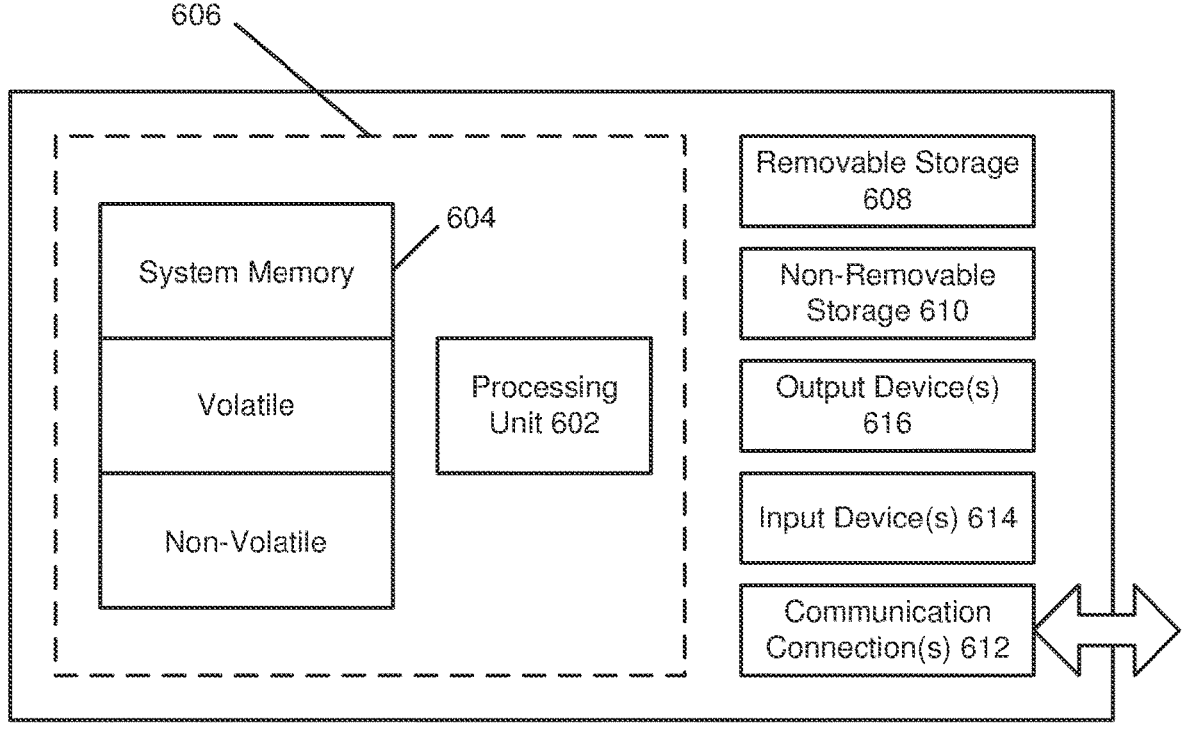
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.3 networks, the present invention can be used in connection with any suitable wired network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:

receiving a request to create a user defined network by a computing device from an endpoint associated with a first user;

in response to the request, assigning a user defined network identifier to the user defined network by the computing device;

adding the endpoint as a member of the user defined network by the computing device by storing a unique device identifier of the endpoint with the user defined network identifier;

providing the user defined network to an authentication server, comprising providing, to the authentication server, a first owner flag indicating that the endpoint is associated with the first user and that the first user controls the user defined network;

in response to receiving an authentication request from the endpoint including the unique device identifier:

determining that the endpoint belongs to the user defined network based on the unique device identifier; and causing a policy of the user defined network to be applied to the endpoint;

receiving, from the endpoint, a request to add a second user to the user defined network, wherein the request specifies an account of the second user;

transmitting, to the account of the second user, an invitation to join the user defined network, wherein the invitation indicates the policy of the user defined network;

receiving, from the second user, a second unique device identifier of a second endpoint associated with the second user; and in response to receiving a second authentication request from the second endpoint including the second unique device identifier:

determining that the second endpoint belongs to the user defined network based on the second unique device identifier, comprising receiving, from the authentication server, a second owner flag indicating that the second endpoint is not associated with the first user that controls the user defined network; and causing the policy of the user defined network to be applied to the second endpoint, wherein the policy comprises disallowing the second endpoint from exchanging unicast traffic with other endpoints in the user defined network.

2. The method of claim 1, further comprising selecting the policy for the user defined network by the computing device.

3. The method of claim 2, wherein the policy comprises only allowing network traffic between members of the user defined network.

4. The method of claim 3, wherein the network traffic comprises multicast and broadcast traffic.

5. The method of claim 1, where the authentication server is a RADIUS server.

6. The method of claim 1, wherein the user defined network identifier is not transferred between the endpoint and one or more network infrastructure devices.

7. The method of claim 1, wherein providing the user defined network to the authentication server comprises providing the user defined network identifier and a user defined network name.

8. The method of claim 1, wherein providing the authentication server comprises providing the user defined network identifier as part of an authorization profile.

9. The method of claim 1, further comprising:

determining that the invitation was accepted; and in response to the determination, generating and sending a change of authorization for the authentication server, wherein the change of authorization identifies the one or more endpoints associated with the second user.

10. A method comprising:

creating a user defined network for a first user by a computing device;

adding an endpoint associated with the first user as a member of the user defined network by the computing device by storing a unique device identifier of the endpoint with a user defined network identifier for the user defined network;

providing the user defined network to an authentication server, comprising providing, to the authentication server, a first owner flag indicating that the endpoint is associated with the first user and that the first user controls the user defined network;

receiving a request to add a second user to the user defined network from the first user by the computing device;

in response to the request, generating and sending an invitation to the second user by the computing device;

determining that the invitation was accepted by the computing device;

in response to the determination, generating and sending a change of authorization for the user defined network to the authentication server by the computing device, wherein the change of authorization identifies one or more endpoints associated with the second user;

in response to receiving an authentication request from the endpoint including the unique device identifier:

determining that the endpoint belongs to the user defined network based on the unique device identifier; and causing a policy of the user defined network to be applied to the endpoint;

receiving, from the endpoint, a request to add a second user to the user defined network, wherein the request specifies an account of the second user;

transmitting, to the account of the second user, an invitation to join the user defined network, wherein the invitation indicates the policy of the user defined network;

receiving, from the second user, a second unique device identifier of a second endpoint associated with the second user; and in response to receiving a second authentication request from the second endpoint including the second unique device identifier:

determining that the second endpoint belongs to the user defined network based on the second unique device identifier, comprising receiving, from the authentication server, a second owner flag indicating that the second endpoint is not associated with the first user that controls the user defined network; and causing the policy of the user defined network to be applied to the second endpoint, wherein the policy comprises disallowing the second endpoint from exchanging unicast traffic with other endpoints in the user defined network.

11. The method of claim 10, where the authentication server is a RADIUS server.

12. The method of claim 10, wherein the user defined network identifier is not transferred between the endpoint and one or more network infrastructure devices.

13. The method of claim 10, further comprising only allowing network traffic between the first user and the second user in the user defined network.

14. The method of claim 13, wherein the network traffic comprises multicast and broadcast traffic.

15. The method of claim 10, wherein providing the user defined network to the authentication server comprises providing the user defined network identifier and a user defined network name.

16. The method of claim 10, wherein providing the user defined network to the authentication server comprises providing the user defined network identifier as part of an authorization profile.

17. A system comprising:

an endpoint associated with a first user;

a plurality of network infrastructure devices associated with a network; and an authentication server, wherein the authentication server is adapted to:

receive a request to authenticate the endpoint;

in response to the request, authenticate the endpoint;

determine that the endpoint is associated with a user defined network based on determining that a unique device identifier of the endpoint is associated with a user defined network identifier of the user defined network;

in response to the determination, provide a user defined network identifier to one or more of the plurality of network infrastructure devices for enforcement by the one or more of the plurality of network infrastructure devices, comprising providing a first owner flag indicating that the endpoint is associated with the first user and that the first user controls the user defined network, wherein the one or more of the plurality of network infrastructure devices cause a policy of the user defined network to be applied to the endpoint;

receive, from the endpoint, a request to add a new user to the user defined network, wherein the request specifies an account of the new user;

transmit, to the account of the new user, an invitation to join the user defined network, wherein the invitation indicates the policy of the user defined network;

receive, from the new user, a second unique device identifier of a second endpoint associated with the new user; and in response to receiving a second authentication request from the second endpoint including the second unique device identifier:

determine that the second endpoint belongs to the user defined network based on the second unique device identifier; and provide the user defined network identifier to one or more of the plurality of network infrastructure devices for enforcement by the one or more of the plurality of network infrastructure devices, comprising providing a second owner flag indicating that the second endpoint is not associated with the first user that controls the user defined network, wherein the one or more of the plurality of network infrastructure devices cause the policy of the user defined network to be applied to the second endpoint, wherein the policy comprises disallowing the second endpoint from exchanging unicast traffic with other endpoints in the user defined network.

18. The system of claim 17, where the authentication server is a RADIUS server.

19. The system of claim 17, wherein the authentication server adapted to provide the user defined network identifier to one or more of the plurality of network infrastructure devices comprises wherein the authentication server adapted to provide the user defined network identifier as part of an authorization profile for the first user.

20. The system of claim 18, wherein the plurality of network infrastructure devices are adapted to only allow the endpoint to communicate with other endpoints that are also associated with the user defined network.

* * * * *